(12) United States Patent
Mizuta et al.

(10) Patent No.: US 7,158,816 B1
(45) Date of Patent: Jan. 2, 2007

(54) FOLDABLE AND PORTABLE MOBILE COMMUNICATION TERMINAL

(75) Inventors: Masatomo Mizuta, Tokyo (JP); Shinji Ikeuchi, Tokyo (JP); Mitsuru Sendouda, Tokyo (JP); Sakae Higano, Tokyo (JP); Hitoshi Sato, Tokyo (JP); Minoru Ohiraki, Tokyo (JP)

(73) Assignees: NEC Corporation, Tokyo (JP); Mitsubishi Steel Mfg., Co., Ltd., Tokyo (JP)

( * ) Notice: Subject to any disclaimer, the term of this patent is extended or adjusted under 35 U.S.C. 154(b) by 524 days.

(21) Appl. No.: 10/410,598

(22) Filed: Apr. 10, 2003

(30) Foreign Application Priority Data

Apr. 10, 2002 (JP) .............................. 2002-107405

(51) Int. Cl.
*H04M 1/00* (2006.01)

(52) U.S. Cl. ................. 455/575.3; 455/575.1; 455/575.4; 455/90.3; 379/433.13; 379/433.04; 379/433.07

(58) Field of Classification Search ............. 455/575.1, 455/575.3, 575.4, 90.3; 379/433.13, 433.04, 379/433.07

See application file for complete search history.

(56) References Cited

U.S. PATENT DOCUMENTS

| | | | | |
|---|---|---|---|---|
| 5,485,517 | A * | 1/1996 | Gray | 379/433.13 |
| 6,549,789 | B1 * | 4/2003 | Kfoury | 455/550.1 |
| 6,850,773 | B1 * | 2/2005 | Ghassabian | 455/550.1 |
| 6,850,784 | B1 * | 2/2005 | SanGiovanni | 455/575.1 |
| 2002/0061770 | A1 * | 5/2002 | Ozaki | 455/566 |
| 2003/0045245 | A1 * | 3/2003 | Hikishima | 455/90 |

FOREIGN PATENT DOCUMENTS

| | | |
|---|---|---|
| CN | 1212795 A | 3/1999 |
| GB | 2 343 324 | 5/2000 |
| JP | 2000240636 | 9/2000 |
| JP | 2001-136252 | 5/2001 |
| JP | 2001251406 | 9/2001 |
| JP | 2002135380 | 5/2002 |
| WO | WO 97/26712 | 7/1997 |

OTHER PUBLICATIONS

Chinese Office Action Nov. 12, 2004.
English translation of the Chinese Office Action.
Japanese translation of Chinese Office Action with Engilsh translation of pertinent portions.
European Search Report dated Mar. 15, 2004.

* cited by examiner

*Primary Examiner*—Matthew D. Anderson
*Assistant Examiner*—Sanh Phu
(74) *Attorney, Agent, or Firm*—Whitham, Curtis, Christofferson & Cook, PC

(57) ABSTRACT

A foldable and portable mobile communication terminal is formed as a two-folded type in which a lower-side body unit and upper-side unit are coupled openably and closably by a two-shaft hinge mechanism. The two-shaft hinge mechanism includes a first hinge unit that allows the upper-side body unit to rotate with respect to the lower-side body unit up to the open state defining a predetermined talking position, and a second hinge unit that allows the first hinge unit to rotate in a direction different from the aforementioned rotational direction of the first hinge unit. The first and second hinge units are coupled so that the rotational center axes thereof orthogonally intersect each other.

11 Claims, 6 Drawing Sheets

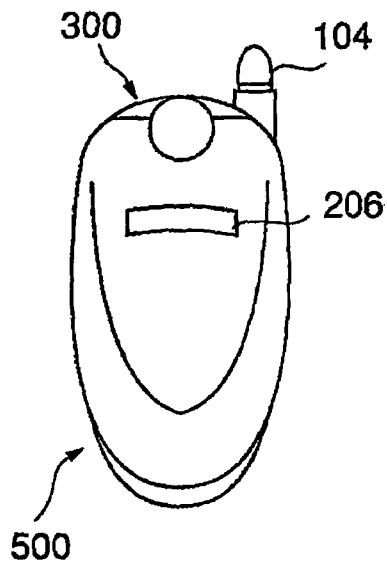
FIG. 1
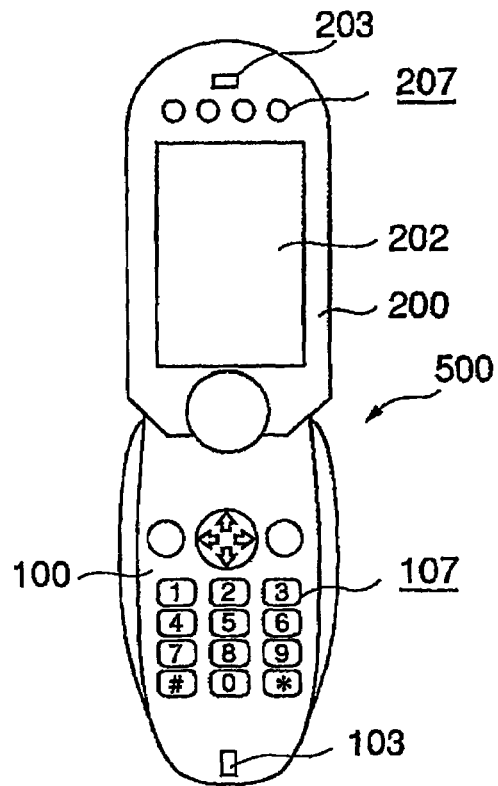
FIG. 2
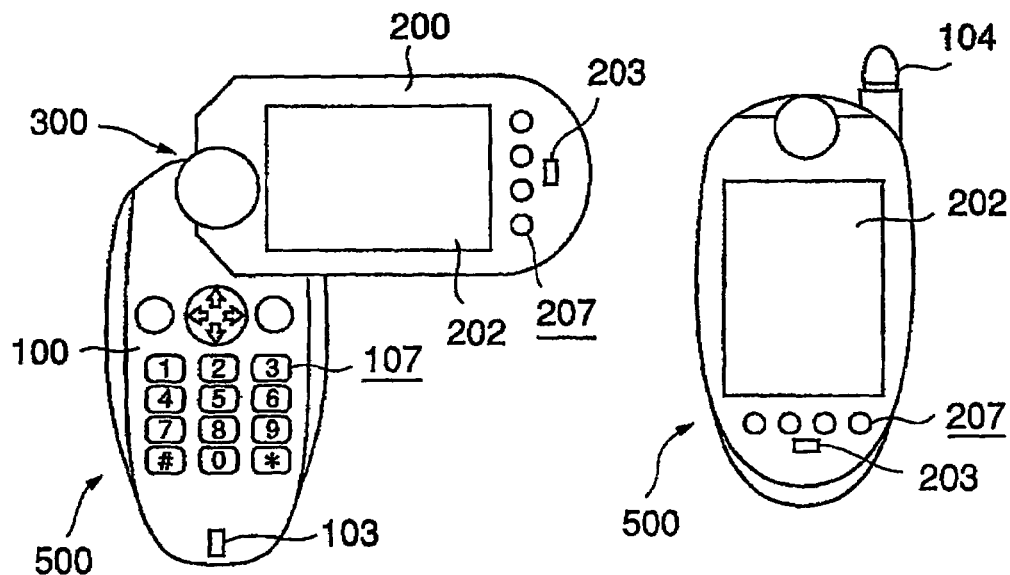
FIG. 3
FIG. 4

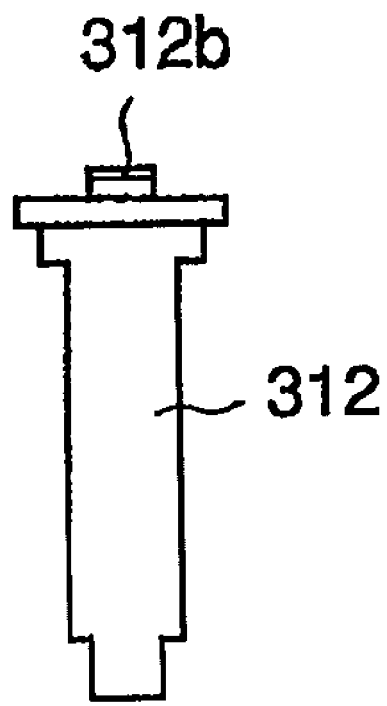
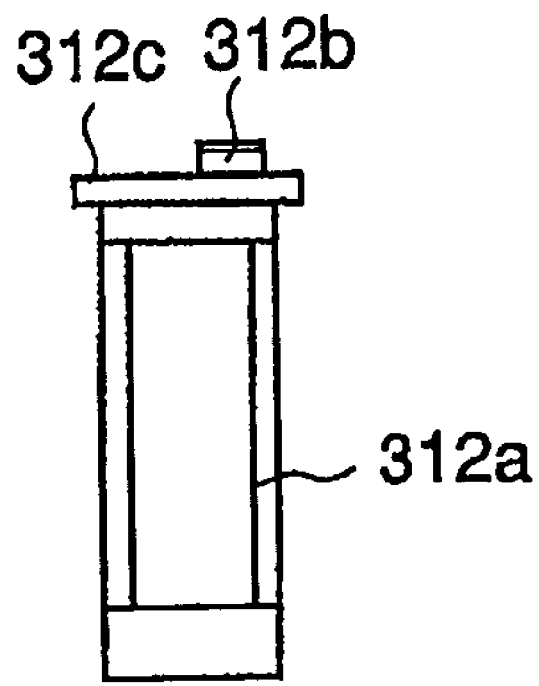
FIG. 7A  FIG. 7B
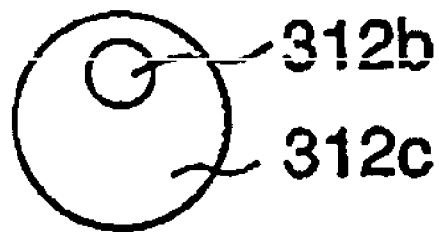
FIG. 7C

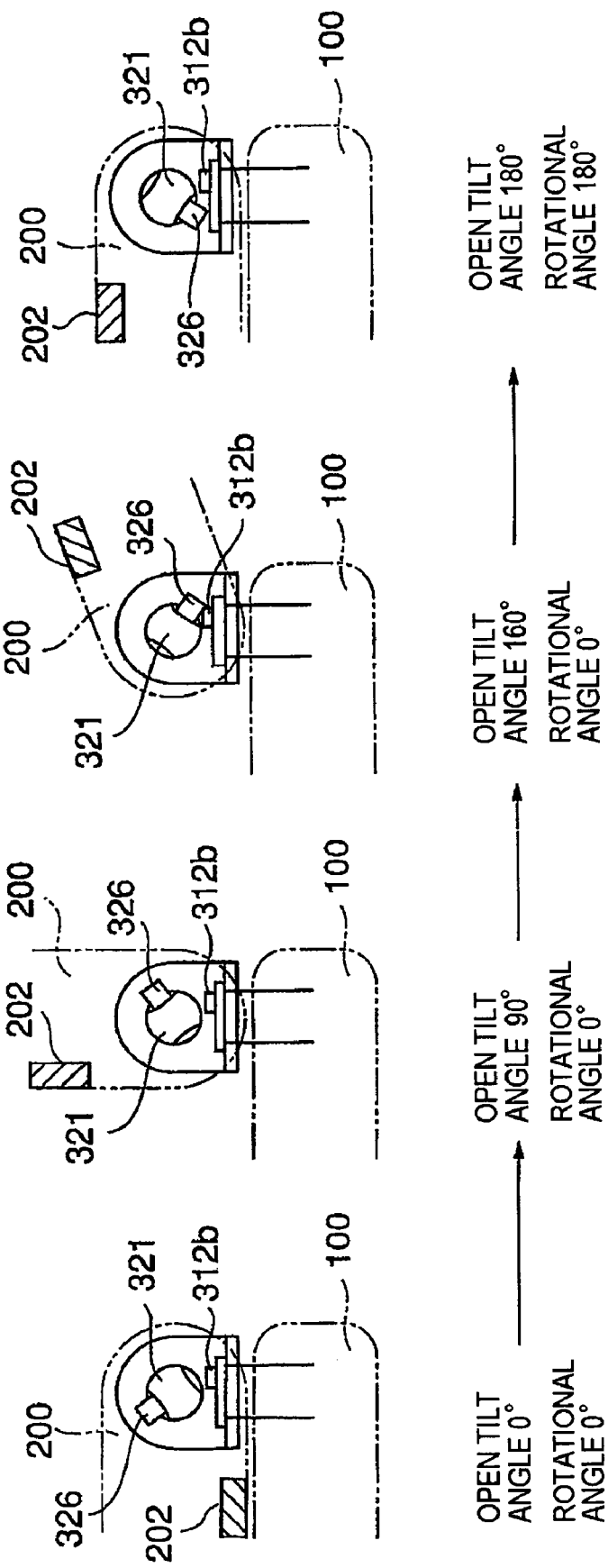

FOLDABLE AND PORTABLE MOBILE COMMUNICATION TERMINAL

BACKGROUND OF THE INVENTION

1. Field of the Invention

The present invention relates to a foldable and portable mobile communication terminal represented by a portable mobile telephone. More particularly, the present invention relates to a foldable and portable mobile communication terminal allowing the processing of operational information according to a program incorporated therein, the processing of communication information with an opposite party, related to the aforementioned operational information processing, and data display therefor

2. Description of the Related Art

As an example of such a foldable and portable mobile communication terminal, the following foldable and portable mobile telephone is known. This foldable and portable mobile telephone includes a lower-side body unit and an upper-side body unit. The lower-side body unit has an operation section comprising a plurality of operation buttons each serving an operational function for users. The upper-side body unit has a display section for displaying data on the operational information processing associated with operation with respect to the operation section, and on the processing of communication information with an opposite party, related to the above-described operational information processing. The lower-side and upper-side units are coupled openably and closably by a hinge mechanism constituted of a single-shaft hinge unit, and are formed into a two-folded type. Such a foldable and portable mobile telephone is disclosed in, for example, Japanese Unexamined Patent Publication (JP-A) No. 2001-136252.

As a hinge mechanism applied to the foldable and portable mobile telephone, the following one is known. This hinge mechanism includes a hinge unit having a first rotating shaft (rotating shaft for opening and closing). By this hinge unit, the upper-side unit is rotated about the first rotating shaft by an angle of approximately 180 degrees with respect to the lower-side unit into an open state. This open state is defined as a talking position. In the case of such a foldable and portable mobile telephone, on the folded surface of the lower-side body unit with respect to the upper-side body unit, a microphone for collecting sounds is usually provided besides the operation section. On the other hand, on the folded surface of the upper-side body unit with respect to the lower-side body unit, a speaker for uttering voices is provided besides the display section.

As described above, in the case of a conventional foldable and portable communication terminal, the open state in which the upper-side body unit has been rotated with respect to the lower-side body unit by an angle of approximately 180 degrees using the hinge unit, is defined as a talking position. This, however, involves a problem in that the usability in the open position is poor. For example, when the user brings his or her ear near to the speaker on the upper-side body unit while talking with an opposite party, his or her mouth moves away from the microphone on the lower-side body unit, and thereby hard talking could be caused. Also, in this open position, the entire communication terminal with the shape thereof lengthened might be a hindrance to the usage thereof. This is because the conventional foldable and portable mobile communication terminal has no function of rotating the upper-side body unit with respect side body unit.

SUMMARY OF THE INVENTION

Accordingly, it is an object of the present invention to solve the above-described problems and to provide a foldable and portable mobile communication terminal that facilitates talking by improving the operation of the foldable type, and that provides excellent usability by allowing it to be used with the overall size thereof remained compact.

The present invention is applied to a foldable and portable mobile communication terminal configured as a two-folded type by openably and closably coupling, by a hinge mechanism, a lower-side body unit that includes an operation section comprising a plurality of operation buttons, and an upper-side body unit that includes a display section for displaying data on the operational information processing associated with operation with respect to the operation section, and on the processing of communication information with an opposite party, related to the above-described operational information processing.

According to an aspect of the present invention, the foldable and portable mobile communication terminal has a two-shaft hinge mechanism as a hinge mechanism. The two-shaft hinge mechanism comprises a first hinge unit that allows the upper-side body unit to rotate with respect to the lower-side body unit up to the open position defining a predetermined talking position, and a second hinge unit that allows the first hinge unit to rotate in the direction different from the aforementioned rotational direction of the first hinge unit. The first and second hinge units are coupled so that their rotational center axes orthogonally intersect each other.

In the foldable and portable mobile communication terminal according to the present invention, the first hinge unit is accommodated in the upper-side body unit, and the second hinge unit is accommodated in the lower-side body unit so that a part thereof projects from the lower-side body unit.

In the foldable and portable mobile communication terminal according to the present invention, the first and second hinge units has first and second rotating shafts, respectively. The two-shaft hinge mechanism defines the predetermined talking position by rotating the upper-side body unit about the first rotating shaft, and also allows the upper-side body unit to rotate about the second rotating shaft at a position within the surface of the lower-side body unit in either of the clockwise and counterclockwise directions. In addition, the two-shaft hinge mechanism has tilt-angle adjusting functions of controlling the open tilt-angle of the upper-side body unit according to the rotational angle thereof about the second rotating shaft so as to become an angle defining the predetermined talking position, and an angle formed by the upper-side body unit rotating about the second rotating shaft off the angle defining the predetermined talking position.

In the foldable and portable mobile communication terminal according to the present invention, the tilt-angle adjusting functions of the two-shaft hinge mechanism rotate the upper-side body unit about the first rotating shaft from the closed state in which the rotational angle of each of the first and second rotating shafts is 0 degree, up to the open state, and thereafter, the tilt-angle adjusting functions can set the open tilt-angle for defining the predetermined talking position, in a range of 160 to 170 degrees. Also, the tilt-angle adjusting functions can perform setting such that the upper-side body unit can rotate about the second rotating shaft from the open tilt-angle range of 160 to 170 degrees, in an angle range of 180 degrees in either of the clockwise and counterclockwise directions. When the rotational angle about the second rotating shaft is in a range of 0 to 90 degrees, the tilt-angle adjusting functions can rotate the upper-side body unit from the open till-angle range of 160 to 170 degrees up to an open tilt-angle of 180 degrees in a variable manner, and when the rotational angle about the second rotating shaft is in a range of 90 to 180 degrees, the tilt-angle adjusting functions can rotate the upper-side body unit while maintaining the open tilt-angle at 180 degrees.

BRIEF DESCRIPTION OF THE DRAWINGS

FIG. 1 is a plan view illustrating a foldable and portable mobile telephone according to an embodiment of the present invention, in which the upper-side body unit thereof is closed with respect to the lower-side body unit thereof;

FIG. 2 is a plan view illustrating the open state of the foldable and portable mobile telephone shown in FIG. 1, in which the upper-side body unit has been rotated with respect to the lower-side body unit so as to become opened to the lower-side body unit;

FIG. 3 is a plan view illustrating a midway state of rotating in which the upper-side body unit has been rotated from the open state shown in FIG. 2, with respect to the lower-side body unit by 90 degrees in the clockwise direction;

FIG. 4 is a plan view illustrating a folded and superimposed state in which the upper-side body unit has further been rotated from the state shown in FIG. 3, with respect to the lower-side body unit by 90 degrees in the clockwise direction;

FIGS. 7A to 7C are views illustrating the construction of a second rotating shaft (horizontal rotational shaft) used for the second hinge unit shown in FIG. 6;

FIGS. 9A to 9D are perspective views showing states of the main section of the two-shaft hinge mechanism in the foldable and portable mobile telephone shown in FIGS. 1 to 4, which vary according to the transition of opening/closing operation conditions by the two-shaft hinge mechanism.

DESCRIPTION OF THE PREFERRED EMBODIMENTS

Figure 5:
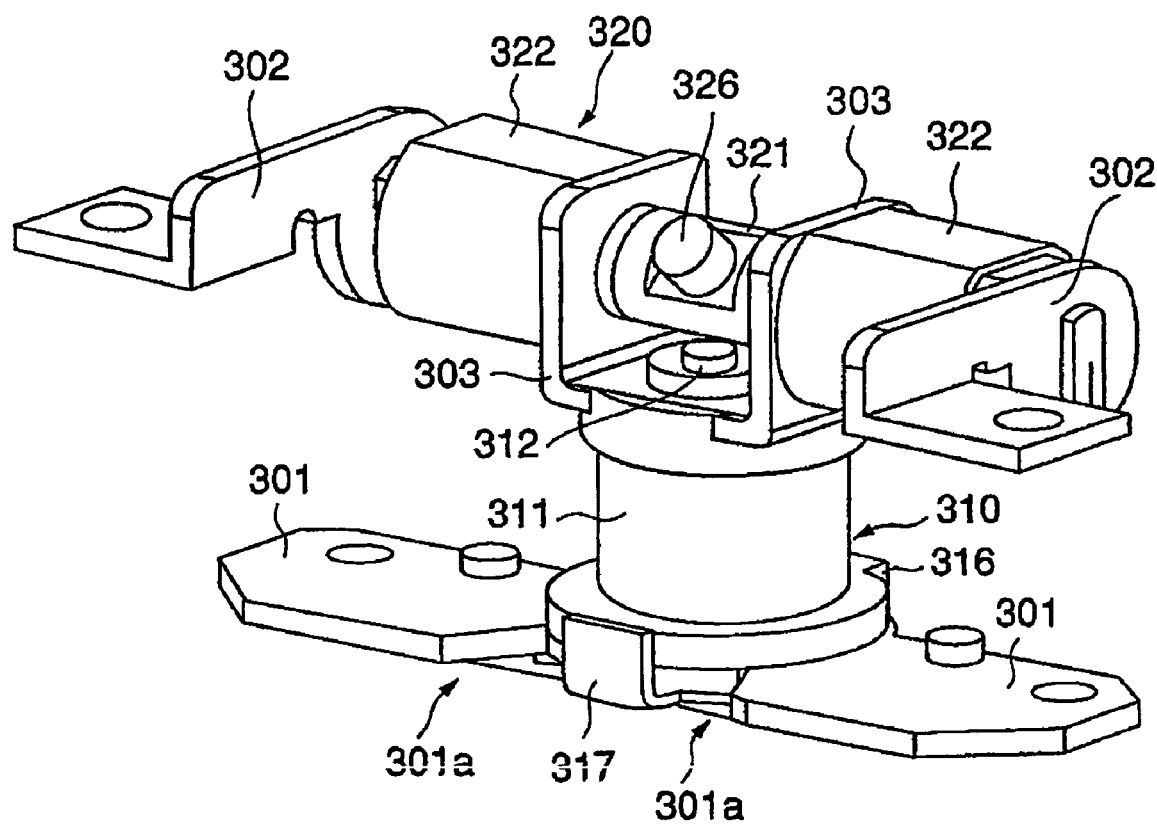
FIG. 5 is a perspective view illustrating the basic construction of a two-shaft hinge mechanism incorporated in the foldable and portable mobile telephone shown in FIGS. 1 to 4.

Hereinafter, the embodiment of the present invention applied to a foldable and portable mobile telephone will be described with reference to the accompanying drawings.

FIGS. 1 to 4 are plan views illustrating the basic arrangements of a foldable and portable mobile telephone (hereinafter referred to as a "mobile telephone") 500 according to the embodiment of the present invention, which varies according to the transition of rotational operation conditions. FIG. 1 shows the state in which an upper-side body unit 200 has not been rotated with respect to a lower-side body unit 100, that is, a closed state. On the other hand, FIG. 2 shows the state in which the upper-side body unit 200 has been rotated with respect to the lower-side body unit 100, that is, an open state FIG. 3 illustrates a midway state of rotating in which the upper-side body unit 200 has been rotated with respect to the lower-side body unit 100 from the open state shown in FIG. 2, by an angle of 90 degrees in the clockwise direction. FIG. 4 shows a folded and superimposed state in which the upper-side body unit 200 has further been rotated with respect to the lower-side body unit 100 from the midway state of rotating shown in FIG. 3, by 90 degrees in the clockwise direction.

The mobile telephone 500 has a lower-side body unit 100 having an operation section comprising a plurality of operation buttons 107 each serving an operational function for users. The lower-side body unit 100 is provided with an antenna 104. The plurality of operation buttons 107 includes operation keys such as ten-keys and the like. The mobile telephone 500 has also an upper-side body unit 200 including a display portion 202 for displaying data on at least two processing: the processing of operational information associated with the operation with respect to the operation section, and the processing of communication information with an opposite party, related to the above-described operational information processing. The lower-side body unit 100 and upper-side body unit 200 are coupled openably/closably and rotatably by a two-shaft hinge mechanism 300 constituted of two-shaft hinge units, and are formed into a two-folded type.

The two-shaft hinge mechanism according to this embodiment includes first and second hinge units, and has upper-side body unit tilt-angle adjusting functions defined by a plurality of functions as described below. The first hinge unit and second hinge unit has a first rotating shaft (opening/closing rotating shaft) and a second rotating shaft (horizontal rotating shaft), respectively. The first hinge unit performs the function of rotating the upper-side body unit 200 with respect to the lower-side body unit 100 about the first rotating shaft into an open state, thereby defining the predetermined talking position. In this open state, the second hinge unit performs the function of allowing the upper-side body unit 200 to rotate about the second rotating shaft at a position within the surface of the lower-side body unit 100 in either of the clockwise and counterclockwise directions. The second hinge unit also performs the function of controlling the open tilt-angle of the upper-side body unit 200 according to the rotational angle thereof about the second rotating shaft so as to become not only an angle defining the predetermined talking position, but also an arbitrary angle formed by the upper-side body unit 200 rotating about the second rotating shaft off the angle defining the predetermined talking position.

In the two-shaft hinge mechanism 300 according to this embodiment, the state in which the rotational angle of each of the first and second rotating shafts is 0 degree, is a closed state. The two-shaft hinge mechanism 300 rotates the upper-side body unit 200 with respect to the lower-side body unit 100 about the first rotating shaft from the closed state up to the open state, and thereafter, in order to define the predetermined talking position, the two-shaft hinge mechanism 300 can set the open tilt-angle in a range of 160 to 170 degrees. Furthermore, the two-shaft hinge mechanism 300 can rotate the upper-side body unit 200 about the second rotating shaft from the rotational angular position in the range of 160 to 170 degrees, in a range of 180 degrees in either of the clockwise and counterclockwise directions. When the rotational angle of the upper-side body unit 200 about the second rotating shaft is in a range of 0 to 90 degrees, the tilt-angle adjusting functions can rotate the upper-side body unit 200 from the open tilt-angle range of 160 to 170 degrees up to an open tilt angle of 180 degrees in a variable manner. When the rotational angle of the upper-sided body unit 200 about the second rotating shaft is in a range of 90 to 160 degrees, the tilt-angle adjusting functions can rotate the upper-side body unit 200 while maintaining the open tilt-angle at 180 degrees. The functions as described above are the upper-side body unit tilt-angle adjusting functions. Here, the "horizontal rotating" mentioned in the present description does not mean "rotating parallel to the ground".

In the mobile telephone 500 according to this embodiment, besides the operation section, a microphone 103 for collecting sounds is also provided at an end portion of the folded surface of the lower-side body unit 100 with respect to the upper-side body unit 200. Also, a speaker 203 for uttering voices is provided at the end portion in the vicinity of the display portion (a first display portion) 202 on the folded surface of the upper-side body unit 200 with respect to the lower-side body unit 100. Furthermore, with the mobile telephone 500 according to the present embodiment, in the vicinity of the display portion 202 on the folded surface of the upper-side body unit 200, there is provided an operation section for display selection comprising a plurality of operation buttons 207 serving a selectable display operation function for users. Moreover, on the surface opposite to the folded surface of the upper-side body unit 200, there is provided another display portion (a second display portion) 206 for displaying simple data including at least call notice out of data on the communication information processing.

The lower-side body unit 100 and upper-side body unit 200 each have a predetermined thickness and have flat oval shapes of substantially the same size. The lower-side and upper-side body unit 100 and 200 are mechanically and electrically connected via the two-shaft hinge mechanism 300 that comprises two hinge units orthogonally intersecting each other, and that are independently rotatable. Thus, the mobile telephone 500 has a structure in which the upper-side body unit 200 is openable/closable and rotatable with respect to the lower-side body unit 100 by the two-shaft hinge mechanism 300.

FIG. 5 is a perspective view illustrating the basic construction of the two-shaft hinge mechanism 300 incorporated in the mobile telephone 500. The two-shaft hinge mechanism 300 is formed by coupling the first hinge unit (a hinge unit for opening/closing rotation) 320 and the second hinge unit (a hinge unit for horizontal rotation) 310. The second hinge unit 310 is accommodated in the lower-side body unit 100. In order to form the second rotating shaft (horizontal rotating shaft), the second hinge unit 310 includes a metallic base bracket 301 fixed within the lower-side body unit 100, an outer case 311 rotatably combined with the base bracket 301, and a fixed shaft 312 that is located in the outer case 311 and fixed by the base bracket 301, and of which the front end projects perpendicularly to the surface equipped with the operation section. The outer case 311 can rotate about the fixed shaft 312 as a central axis thereof. On the other hand, the first hinge unit 320 is coupled to the front end side of the second hinge unit 310 so as to be perpendicular to the fixed shaft 312, and has the first rotating shaft (an opening/closing rotating shaft) 321 capable of turning so as to be parallel to the lower-side body unit 100. The first rotating shaft 321 is disposed so as to pass through the first hinge unit 320.

The second hinge unit 310 is disposed in the lower-side body unit 100 so that a part thereof projects from the lower-side body unit 100. Specifically, the second hinge unit 310 is located in the vicinity of the operation section of the lower-side body unit 100, and is substantially vertically extended from the position being located apart from the upper edge of the operation section by a predetermined distance, and at the center in the width direction thereof so as to allow the upper-side body unit 200 to freely rotate. Here, "a predetermined distance" refers to substantially half the thickness dimension of the upper-side body unit 200. On the other hand, the first hinge unit 320 including the first rotating shaft 321 is rotatably installed to the upper-side body unit 200 so as to be located at substantially the central portion in the thickness direction of the upper-side body unit 200. At the central portion of the first hinge unit 320, the first rotating shaft 321 is rotatably connected to the front end of the second hinge unit 310 via a coupling bracket 303.

More specifically, in the first hinge unit 320, outer cases 322 are installed at the opposite ends of the first rotating shaft 321 capable of freely rotating via the coupling bracket 303. Also, at the end portion of each of the outer cases 322 in the extending direction, an L-shaped bracket 302 is installed for connecting the first rotating shaft 321 and upper-side body unit 200. The brackets 302 are each formed of a metal plate. In each of the brackets 302, one end side thereof is connected to respective one of the front ends of the rotating shaft. The other end side of each of the brackets 302 is bent into a right angle, namely formed into an L-shape. Each of these bent portions forms a horizontally-extending mounted wing portion in the illustrated configuration, and is strongly fixed within the upper-side body unit 200. Thus, the first hinge unit 320 including the coupling bracket 303 is accommodated in the upper-side body unit 200.

As describe above, the second hinge unit 310 has a structure in which the outer case 311 rotates about the fixed shaft 312 fixed to the base bracket 301. A rotation stopper 316 is provided at the lower end portion of the outer case 311. The vicinity of the front end of the fixed shaft 312 is covered by a cap (not shown) to prevent the entry of water, dirt, and the like into the lower-side body unit 100.

In the two-shaft hinge mechanism 300, the outer case 311 of the second hinge unit 310 is strongly fixed to the coupling bracket 303 of the first hinge unit 320. As a result, when the second hinge unit 310 rotates, the entire first hinge unit 320 including the coupling bracket 303 rotates together therewith. The outer case 311, coupling bracket 303, and rotation stopper 316 may be provided by integral molding.

Figure 6:
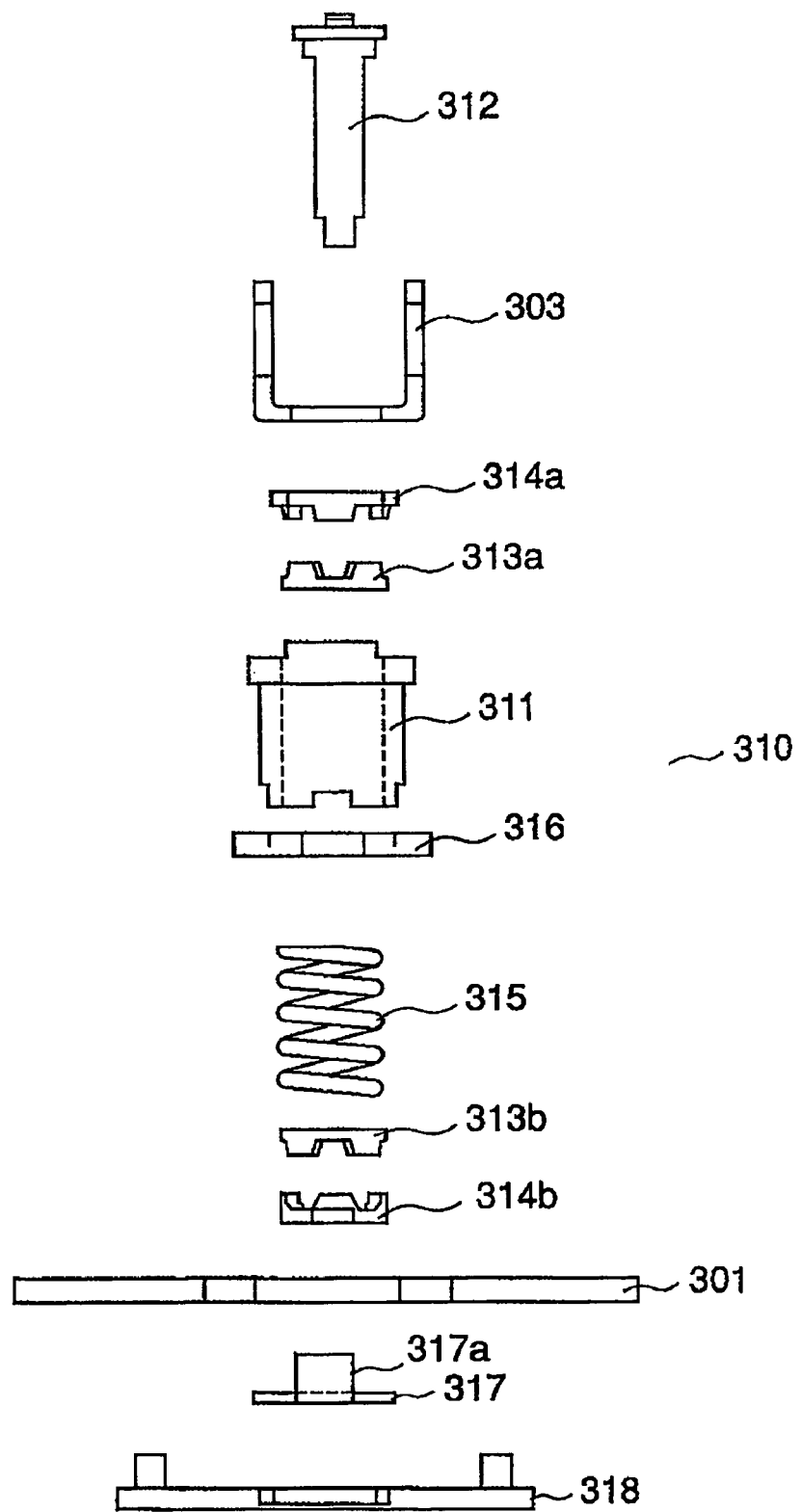
FIG. 6 is an exploded view illustrating the construction of a second hinge unit (hinge unit for horizontal rotation) included in the two-shaft hinge mechanism shown in FIG. 5.

FIG. 6 is an exploded view illustrating the detailed construction of the second hinge unit 310 included in the above-described two-shaft hinge mechanism 300.

In the second hinge unit 310, the fixed shaft 312 thereof is fixed to the base bracket 301. For this purpose, on the fixed shaft 312 side, the coupling bracket 303, a rotating cam 314a, a fixed cam 313a, the outer case 311, and the rotation stopper 316 are installed in this order. On the other hand, on one surface side of the base bracket 301, a rotating cam 314b, fixed cam 313b, coil spring 315 are installed in this order. In particular, the above-described portions are combined so that the coil spring 315 has a structure energizing two pairs of cam mechanisms. As a consequence, the above-described structure portions serves as a torque unit generating a rotational torque. Besides, a movable rotation stopper 317 and stopper holding-down plate 318 are installed on the other surface side of the base bracket 301.

FIGS. 7A to 7C show the detailed construction of the fixed shaft 312 used for the second hinge unit 310. Here, FIG. 7A is a side view when the fixed shaft 312 is seen from one direction, and FIG. 7B is a side view when the fixed shaft 312 is seen from the other direction. FIG. 7C is a plan view when seen from above.

The fixed shaft 312 has substantially a solid-cylindrical shape or hollow-cylindrical shape, and is fixed to the base bracket 301. In the fixed shaft 312, a part of the side surface thereof is cut, and an incision planar portion 312a is formed. The top portion 312c of the fixed shaft 312 has a solid-cylindrical projection 312b formed at an off-center position thereof.

In the second hinge unit 310, the two pairs of cam mechanisms are formed by respectively pairing the fixed cams 313a and 313b mounted on the fixed shaft 312, with the rotating cams 314a and 314b mounted on the outer case 311. These two pairs of cam mechanisms are arranged at positions line-symmetrical with respect to the coil spring 315. The fixed cams 313a and 313b each have a hole corresponding to the sectional shape of the fixed shaft 312, and the fixed shaft 312 is inserted into these holes. Thereby, the fixed cams 313a and 313b are configured to be restricted in the rotational direction, but to be able to move in the central axis direction of the fixed shaft 312. Because the fixed cams 313a and 313b are energized by the coil spring 315 in the central axis direction, they are pressed down on the rotating cams 314a and 314b fixed to the outer case 311. The rotating cams 314a and 314b each have protrusions protruding in the central axis direction, formed for every 90 degrees, and each of the protrusions is connected to a flat portion by a slope having an angle. On the other hand, the fixed cams 313a and 313b each have grooves formed for every 90 degrees, and the bottom of each of the grooves is connected to a flat portion by a slope.

In the second hinge unit 310, therefore, when the outer case 311 rotates, the rotating cams 314a and 314b fixed to the outer case 311 rotate and slide on the fixed cams 313a and 313b, respectively. On the other hand, the fixed cams 313a and 313b are pressed down on the rotating cams 314a and 314b by the coil spring 315. This generates frictions on the contact surfaces between the fixed cams 313a and 313b and the rotating cams 314a and 314b, respectively, and creates a moderate load torque. Immediately before each of the protrusions and a respective one of the grooves in the two pairs of cam mechanisms are engaged, each of the protrusions of the rotating cams 314a and 314b approaches the slope of a respective one of the grooves of the fixed cams 313a and 313b, respectively. At this time, the fixed cams 313a and 313b, respectively, are pulled into the rotating cams 314a and 314b sides by a pressing force of the coil spring 315 so that the grooves and the respective protrusions are engaged. The position and structure associated with such an action may hereinafter be referred to as a "click position" and a "click mechanism".

In order to rotate the rotating cams 314a and 314b from the state in which the grooves and the respective protrusions have been engaged, there is a need for a torque enough to lift the fixed cams 313a and 313b energized by the coil spring 316 due to the aforementioned rotational operation of the rotating cams 314a and 314b, up to the height where the protrusions slip off the respective grooves. Therefore, in the vicinity of the click position where the click mechanism functions, it becomes possible to generate a torque to pull in the fixed cams 313a and 313b to the click position, and also to create a holding torque enough to pull out the fixed cams 313a and 313b from the click position. Such a pair of cam mechanisms are arranged at positions line-symmetrical with respect to the coil spring 315, and the protrusions of the rotating cams 314a and 314b and the grooves of the fixed cams 313a and 313b, respectively, are located at the same positions with respect to the outer periphery of the fixed shaft 312. As a result, the pull-in torques simultaneously generate in the pair of cam mechanisms, but it is possible to suppress shakiness occurring when the click action generates, by somewhat displacing the installation positions of the pair of cam mechanisms from each other with respect to the peripheral direction of the fixed shaft 312.

The basic principle underlying such a click mechanism is to generate a holding force for pulling in and fixing the upper-side body unit 200 in the closed state, in which the rotational angle of the first rotating shaft 321 of the first hinge unit 320 and that of the outer case 311 of the second hinge unit 310 are each 0 degree, and in the open state defined as the predetermined talking position. However, even when the upper-side body unit 200 is rotated about the fixed shaft 312 from the open state defined as the predetermined talking position in either of the clockwise and counterclockwise directions, it is desirable to configure the click mechanism to pull in and fix the upper-side body unit 200 at plural predetermined kinds of rotational angular positions. Here, "plural predetermined kinds of rotational angular positions" refers to specific positions, such as the front, right side, directly underneath position, left side, and the like in the above-described example.

Figure 8:
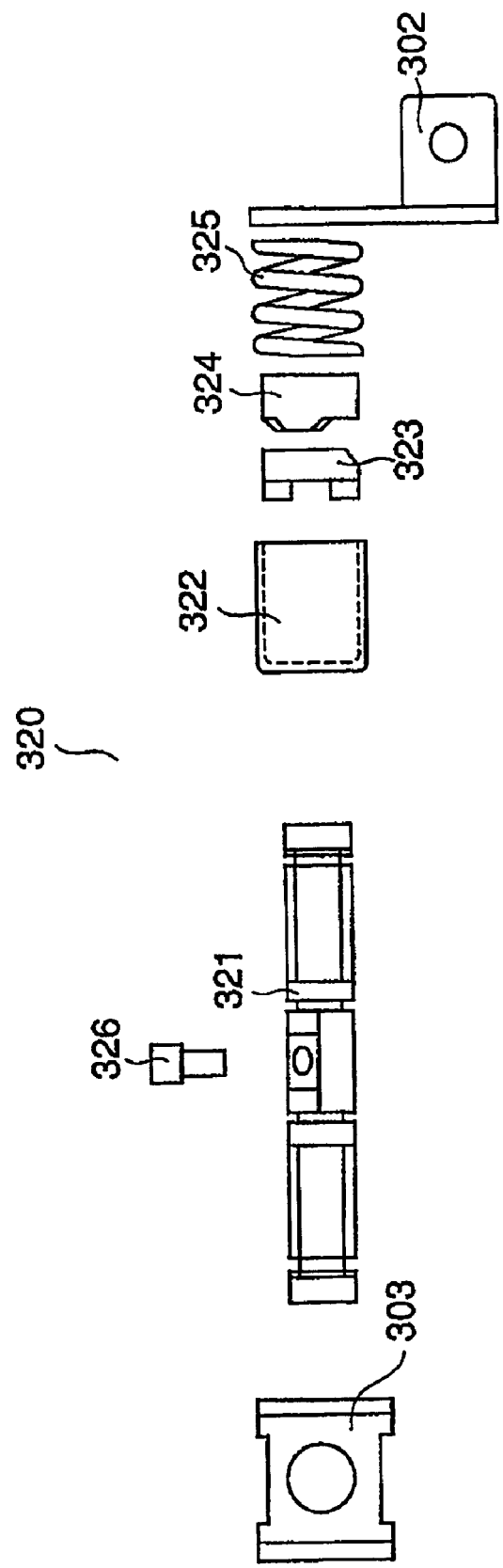
FIG. 8 is an exploded view showing the construction of the main section of a first hinge unit (hinge unit for opening/closing rotation) included in the two-shaft hinge mechanism shown in FIG. 5.

FIG. 8 is an exploded view showing the construction of the main section of the first hinge unit 320 included in the above-described two-shaft hinge mechanism 300.

The first hinge unit 320 fixes one end side of the outer case 322 to one side of the coupling bracket 303 via the first rotating shaft 321. On the other end side of the outer case 322, a fixed cam 323, rotating cam 324, and coil spring 325 are installed in this order, and the fixed cam 323 is fixed to the outer case 322 by mounting the bracket 302. The cam mechanism comprising the fixed cam 323 and rotating cam 324 is configured to be energized by the coil spring 325. This allows this structure portion to serve as a torque unit for generating an opening/closing torque. A similar structure is formed on the other side of the coupling bracket 303, as well.

In the first hinge unit 320, as in the case of the fixed shaft 312, the first rotating shaft 321 has substantially a solid-cylindrical shape or hollow-cylindrical shape, and a part of the side surface thereof is cut, thereby forming an incision planar portion 312a. The rotating cam 324 has a hole corresponding to the sectional shape of the rotating shaft 321, and the first rotating shaft 321 is inserted into this hole. Thereby, the rotating cam 324 becomes rotatable integrally with the rotating shaft 321, and is also movable in the central axis direction of the rotating shaft 321. However, with respect to the central axis direction, the rotating cam 324 is pressed down on the fixed cam 323 fixed to the outer case 322 since it is energized by the coil spring 325.

The fixed cam 323 and rotating cam 324 have protrusions protruding in the central axial direction and grooves, respectively. In particular, these protrusions and grooves are configured to generate a torque in the closed direction when the opening/closing angle is in a range of −10 to 10 degrees, and generate a torque in the open direction when the opening/closing angle is in a range of 150 to 190 degrees. The opening/closing angle is limited to the range of 0 to 180 degrees by a rotation limiting mechanism described later. However, since a torque in the closed direction occurs in the vicinity of an opening/closing angle of 0 degree, and a torque in the open direction occurs in the vicinity of that of 180 degrees, it is possible to inhibit shakiness of the upper-side body unit 200 in the closed state and in the open state at an opening/closing angle of 180 degrees, and also to create an adequate holding force. In the first hinge unit 320, because a pair of torque units are arranged at positions line-symmetrical with respect to the coupling bracket 303, the above described torques occurs in synchronization.

The two-shaft hinge unit 300 comprising the first hinge unit 320 and second hinge unit 310 as described above has the following construction. The position where the open tilt-angle of the upper-side body unit 200 with respect to the lower-side body unit 100 is in a range of 160 to 170 degrees, is defined as a predetermined talking position. Installed into the first hinge unit 320, is a pull-in opening/closing cam (a cam mechanism comprising the fixed cam 323 and rotating cam 324) for forcibly pressing down the upper-side body unit 200 with the open tilt-angle being 180 degrees, when the upper-side body unit 200 is to be rotated about the fixed shaft 312 from the above-described talking position, in a range of 180 degrees in either of the clockwise and counterclockwise directions.

Next, the aforementioned rotation limiting mechanism of the two-shaft hinge mechanism 300 will be described. The necessity for this rotation limiting mechanism is based on the following reasons. In the present hinge mechanism, the outer case 311 of the second hinge unit 310 and the first rotating shaft 321 of the first hinge unit 320 are allowed to independently rotate. In addition, wiring lines for electrically interconnecting the upper-side body unit 200 and lower-side body unit 100 are provided in each of the units. Furthermore, when the present foldable and portable mobile communication terminal is used as the mobile telephone 500, it is necessary to hold the upper-side body unit 200 with respect to the lower-side body unit 100 at an open tilt-angle of approximately 160 degrees so that the speaker 203 on the upper-side body unit 200 and the microphone on the lower-side body unit 100 exactly fit to the ear and mouth of the user, respectively. For these reasons, the rotation limiting mechanism is essential to limiting the rotation ranges in both the horizontal direction and opening/closing direction.

Hereinafter, with regard to the first rotating shaft 321, the angle at the closed state is defined as 0 degree, and the angles in the opening direction are defined as being positive. With regard to the outer case 311, the angle in the state in which the upper-side body unit 200 has been superimposed over the lower-side body unit 100 with the first rotating shaft 321 being in the closed state, is defined as 0 degree. For example, at the closed state, the rotational angle is represented as 0 degree, and the opening/closing angle is also represented as 0 degree. On the other hand, at the talking position, the operational angle is represented as 0 degree, and the opening/closing angle is represented as 160 degrees.

Here, by providing a stopper for each of the rotating shaft mechanisms, the rotational angle range of the outer case 311 of the second hinge unit 310 in the horizontal direction is limited to ±180 degrees. In addition, when the rotational angle of the outer case 311 is 0 degree, the rotational angle range of the first rotational shaft 321 of the first hinge unit 320 in the opening/closing direction is limited to 0 to 160 degrees. When the rotational angle range of the outer case 311 is 90 to 180 degrees, the rotational angle range of the first rotational shaft 321 is limited to 0 to 180 degrees. Furthermore, when the rotational angle range of the outer case 311 is 0 to 90 degrees, the upper limit of the rotational angle range of the first rotational shaft 321 is smoothly shifted from 160 to 180 degrees.

First, the limitation of the rotation angle range of the outer case 311 in the horizontal direction is performed by a horizontal rotation inhibiting mechanism. As shown in FIG. 6, the horizontal rotation inhibiting mechanism includes the rotation stopper 316, the disk-shaped movable rotation stopper 317 having a claw 317a, and the stopper holding-down plate 318. In the horizontal rotation inhibiting mechanism, the movable rotation stopper 317 is rotatably installed to the base bracket 301 using the stopper holding-down plate 318. The base bracket 301 has an incision 301a (see FIG. 5) provided for allowing the claw 317a of the movable rotation stopper 317 to move by a definite rotational angle. Also, the rotation stopper 316 has a protuberance (not shown) formed at one portion of the outer periphery and protruding in the radial direction. The rotation stopper 316 is fixed to the outer case 311, and rotates integrally with the outer case 311. In this rotation, the protuberance of the rotation stopper 316 is abutted against the claw 317a of the movable rotation stopper 317 as a result of the rotation of the outer case 311, thereby limiting the rotation angle range of the upper-side body unit 200 in the horizontal direction.

Here, in order to limit the rotational angle of the upper-side body unit 200 in the horizontal direction to ±180 degrees, the movable rotation stopper 317 is configured so as to be rotatable by one width of the protuberance of the rotation stopper 316. The aforementioned rotational angle of ±180 degrees means that the upper-side body unit 200 can rotate from the perfectly folded position by 180 degrees in either of the clockwise and counterclockwise directions.

In contrast, the limitation to the rotation angle range in the opening/closing direction of the first rotating shaft 321 is performed by an opening/closing control mechanism comprising a solid-cylindrical opening/closing control pin 326 provided in the first rotating shaft 321, as shown in FIG. 8, and a solid-cylindrical projection 312b provided on the top portion 312c of the fixed shaft 312, as shown in FIGS. 7A to 7C. In the opening/closing control mechanism, the projection 312b on the fixed shaft 312 fixed to the base bracket 301 is disposed at a position decentered to the opening/closing direction. Also, the opening/closing control pin 326 is press-fitted into the first rotating shaft 321 at the vicinity of the central portion thereof in the direction perpendicular to the central axis thereof. Therefore, when the first rotating shaft 321 assumes a position (rotational angle: 160 degrees or more) in the open state, the projection 312b of the fixed shaft 312 makes contact with the opening/closing control pin 326, thereby limiting the opening/closing angle by which the opening/closing control pin 326 is rotated.

Although the opening/closing control pin 326 is press-fitted into the first rotating shaft 321, the opening/closing control pin 326 may instead be installed to the first rotating shaft 321 by another technique such as adhesion or welding, or alternatively, the opening/closing control pin 326 may be provided by integral molding.

For establishment of the electrical interconnection between the upper-side body unit 200 and lower-side body unit 100 in the two-shaft hinge mechanism 300, any known method can be applied. Here, however, FPCs (Flexible Printed Circuits) are utilized. Specifically, FPCs are each wound around the first hinge unit 320 and second hinge unit 310, and the opposite end portions of the FPCs wound around each of the first and second hinges 320 and 310 are connected to electrical circuits in the upper-side body unit 200 and lower-side body unit 100, respectively. In this case, however, in order to enhance the endurance of the FPCs, it is desirable to wind the FPCs more than one turn around each of the first and second hinges 320 and 310.

Anyhow, in the two-shaft hinge mechanism 300 in which such a horizontal rotation inhibiting mechanism and opening/closing control mechanism is established, it is possible to implement the upper-side body unit tilt-angle adjusting functions that can cause a difference in the open tilt-angle of the upper-side body unit 200 between the predetermined talking position and an angular position formed by rotating the upper-side body unit 200 about the fixed shaft 312 off the predetermined talking position FIGS. 9A to 9D are perspective views showing states of the main section of the two-shaft hinge mechanism 300 in the above-described mobile telephone 500, which vary according to the transition of opening/closing operation conditions by the two-shaft hinge mechanism. FIG. 9A shows the closed state in which the open tilt-angle of the upper-side body unit 200 with respect to the lower-side body unit 100 is 0 degree. FIG. 9B shows a midway state of opening in which the open tilt-angle of the upper-side body unit 200 with respect to the lower-side body unit 100 is 90 degree. FIG. 9C shows the open state (talking position state) in which the open tilt-angle of the upper-side body unit 200 with respect to the lower-side body unit 100 is 160 degree. FIG. 9D shows the folded and superimposed state in which the open tilt-angle of the upper-side body unit 200 with respect to the lower-side body unit 100 is 180 degrees.

In the mobile telephone 500, in a state in which the opening/closing operation thereof is limited by the two-shaft hinge mechanism 300, firstly, when the upper-side body unit 200 is opened by 90 degrees from the closed state in which the opening/closing angle (open tilt-angle) is 0 degree as shown in FIG. 9A, a state as shown in FIG. 9B is brought about. As illustrated in FIGS. 9A and 9B, when the opening/closing angles, respectively, are 0 and 90 degrees, the opening/closing control pin 326 and projection 312b do not interfere with each other, so that the rotation in the opening/closing is not subjected to limitation.

Next, when the upper-side body unit 200 is opened up to 160 degrees from the state in which the opening/closing angle is 90 degree as shown in FIG. 9B, a state as shown in FIG. 9C is brought about. In this state, the opening/closing control pin 326 and solid-cylindrical projection 312b make contact with each other, so that the upper-side body unit 200 is inhibited from being opened any more.

Meanwhile, the state in which the opening/closing is 0 degree means a state in which the upper-side body unit 200 has been folded and superimposed over the lower-side body unit 100, and therefore, there exists no opening/closing angle less than 0 degree. In the first rotating shaft 321, when the opening/closing angle is in the vicinity of 0 degree, a pull-in torque in the closing direction is caused by the torque units located at the right and left sides of the rotating shaft 321, while, when the opening/closing angle is in the vicinity of 160 degrees, a pull-in torque in the opening direction is caused. Therefore, at the opening/closing angles of 0 and 160 degrees, the respective states can be retained as they are.

Furthermore, when the upper-side body unit 200 is rotated (in either of the clockwise and counterclockwise directions) about the fixed shaft 312 by 180 degrees from the state in which the opening/closing angle is 160 degrees as shown in FIG. 9C, the upper-side body unit 200 is further opened into the state in which the opening/closing angle is 180 degrees as shown in FIG. 9D. This means that the upper-side body unit 200 comes to a state folded and superimposed over the lower-side body unit 100. At this time, when the upper-side body unit 200 is rotated (in either of the clockwise and counterclockwise directions) about the fixed shaft 312, in an angle range of 90 to 180 degrees, the opening/closing angle becomes 180 degrees, as well.

Herein, as shown in FIG. 9D, the opening/closing control pin 326 moves toward the opposite side of the projection 312b of the fixed shaft 312 so as to shelter therefrom. In this case, the opening/closing control pin 326 do not make contact with projection 312b, but makes contact with the top portion 312c (see FIG. 7B) of the fixed shaft 312 at the opening/closing angle of 180 degrees. As a result, when the angle range in which the upper-side body unit 200 is rotated is 90 to 180 degrees in the horizontal direction, the limits of the rotational angle of the upper-side body unit 200 in the opening/closing direction becomes a range of 0 to 180 degrees.

When the upper-side body unit 200 is rotated about the fixed shaft 312 in a range of 0 to 90 degrees, the opening/closing angle can be smoothly shifted from 0 degree to an arbitrary angle in a range of 90 to 180 degrees, since the opening/closing control pin 326 and projection 312b each have a solid-cylindrical shape. As a consequence, the opening/closing angle smoothly shifts to angles range of 160 to 180 degrees. At the opening/closing angles between 160 and 180 degrees, pull-in torques always occurs in the opening direction, and therefore, the opening/closing control pin 326 remains abutted against the projection 312b, thereby allowing stable rotations without causing shakiness or the like.

The above-described embodiment is an implementation in the case where the present invention is applied to the foldable and portable mobile telephone 500 as an example of a foldable and portable mobile communication terminal. However, the two-shaft hinge mechanism 300, which is the critical section of the present invention, is applicable to any foldable and portable mobile communication terminal of a simple construction adopting a wireless communication system.

The foldable and portable mobile communication terminal according to the present invention enable the following opening/closing operation by the upper-side body unit tilt-angle adjusting functions, by incorporating the two-shaft hinge mechanism comprising the first rotational shaft (opening/closing rotational shaft) and the second rotational shaft (horizontal rotational shaft), as a hinge mechanism for openably and closably coupling the lower-side body unit having the operation section and the upper-side body unit having the display section. By rotating the upper-side body unit about the first rotational shaft into the open state, the open tilt-angle for defining the talking position can be set in the range of 160 to 170 degrees. Also, when the upper-side body unit is rotated about the second rotating shaft from this set position, in the range of 180 degrees in either of the clockwise and counterclockwise directions, the open tilt-angle can be varied in the range of 180 degrees when the rotational angle is in the range of 0 to 90 degrees, and also the upper-side body unit can be rotated while maintaining the open tilt-angle at 180 degrees when the rotational angles is in the range of 90 to 180 degrees. This facilitates talking by improving the operational function of the present mobile communication terminal, and provides excellent usability by allowing it to be used with the overall size thereof remained compact.

Furthermore, in the foldable and portable mobile communication terminal according to the present invention, after the upper-side body unit is opened with respect to the lower-side body unit, the upper-side body unit is rotated about the second rotational shaft by an angle of 180 degrees into a folded and superimposed state, whereby the present mobile communication terminal can be used with the display section face up. In this state, it is possible to immediately perform operation that has not hitherto been implemented, such as directly reading an electronic mail, seeing an image, receiving a telephone after identifying an incoming caller. In addition, it is possible to make use of a screen such as a map while carrying the foldable and portable mobile communication terminal in a compact state with the display section face up. This greatly enhances its usability.

In particular, during talking, the opening/closing angle is restricted to approximately 160 degrees. This enables the user to cause the speaker on the upper-side body unit and the microphone on the lower-side body unit to exactly fit to the ear and mouth of the user, respectively. In addition, during talking, when the upper-side body unit is rotated with respect to the lower-side body unit into a sideways position, the upper-side body unit assumes a position parallel to the keys arranged on the operation section of the lower-side body unit. This simultaneously meets ease of talking and ease of seeing display, thereby providing more improved usability.

What is claimed is:

1. A foldable and portable mobile communication terminal configured as a two-folded type by openably and closably coupling, by a hinge mechanism, a lower-side body unit and an upper-side body unit, said foldable and portable mobile communication terminal comprising:
   an operation section, located on said lower-side body unit, comprising a plurality of operation buttons;
   a first display on a first side of said upper-side body unit, said first display displaying
     a) processing of operational information, and
     b) processing of communication information;
   a second display on a second side of said upper-side body unit, said second side being opposite said first side, said second display displaying data including call notice; and
   a two-shaft hinge mechanism as said hinge mechanism,
   wherein said two-shaft hinge mechanism comprises a first hinge unit that allows said upper-side body unit to rotate with respect to said lower-side body unit up to the open state defining a predetermined talking position, and a second hinge unit that allows said first hinge unit to rotate in a direction different from said rotational direction of said first hinge unit; and
   wherein said first and second hinge units are coupled so that the rotational center axes thereof orthogonally intersect each other.

2. The foldable and portable mobile communication terminal according to claim 1, wherein said first hinge unit is accommodated in said upper-side body unit, and wherein said second hinge unit is accommodated in said lower-side body unit so that a part thereof projects from said lower-side body unit.

3. The foldable and portable mobile communication terminal according to claim 2, wherein:
   said first and second hinge units have first and second rotating shafts, respectively;
   said two-shaft hinge mechanism defines said predetermined talking position by rotating said upper-side body unit about said first rotating shaft, and also allows said upper-side body unit to rotate about said second rotating shaft at a position within the surface of said lower-side body unit in either of the clockwise and counterclockwise directions; and
   said two-shaft hinge mechanism has tilt-angle adjusting functions of controlling the open tilt-angle of said upper-side body unit according to the rotational angle thereof about said second rotating shaft so as to become an angle defining said predetermined talking position and an angle formed by said upper-side body unit rotating about said second rotating shaft off the angle defining said predetermined talking position.

4. A foldable and portable mobile communication terminal configured as a two-folded type by openably and closably coupling, by a hinge mechanism, a lower-side body unit that includes an operation section comprising a plurality of operation buttons, and an upper-side body unit that includes a display section for displaying data on the operational information processing associated with operation with respect to said operation section, and on the processing of communication information with an opposite party, related to said operational information processing, said foldable and portable mobile communication terminal comprising:
   a two-shaft hinge mechanism as said hinge mechanism,
   wherein said two-shaft hinge mechanism comprises a first hinge unit that allows said upper-side body unit to rotate with respect to said lower-side body unit up to the open state defining a predetermined talking position, and a second hinge unit that allows said first hinge unit to rotate in a direction different from said rotational direction of said first hinge unit;
   wherein said first and second hinge units are coupled so that the rotational center axes thereof orthogonally intersect each other;
   wherein said first hinge unit is accommodated in said upper-side body unit;
   wherein said second hinge unit is accommodated in said lower-side body unit so that a part thereof projects from said lower-side body unit; and
   wherein
   said first and second hinge units have first and second rotating shafts, respectively;
   said two-shaft hinge mechanism defines said predetermined talking position by rotating said upper-side body unit about said first rotating shaft, and also allows said upper-side body unit to rotate about said second rotating shaft at a position within the surface of said lower-side body unit in either of the clockwise and counterclockwise directions;
   said two-shaft hinge mechanism has tilt-angle adjusting functions of controlling the open tilt-angle of said upper-side body unit according to the rotational angle thereof about said second rotating shaft so as to become an angle defining said predetermined talking position and an angle formed by said upper-side body unit rotating about said second rotating shaft off the angle defining said predetermined talking position;
wherein:
   said tilt-angle adjusting functions of said two-shaft hinge mechanism rotate said upper-side body unit about said first rotating shaft from the closed state in which the rotational angle of each of said first and second rotating shafts is 0 degree, up to said open state, and thereafter, said tilt-angle adjusting functions can set said open tilt-angle for defining said predetermined talking position in a range of 160 to 170 degrees;
   said tilt-angle adjusting functions can perform setting such that the upper-side body unit can rotate about said second rotating shaft from said open tilt-angle range of 160 to 170 degrees, in an angle range of 180 degrees in either of the clockwise and counterclockwise directions;
   when the rotational angle of the upper-side body unit about said second rotating shaft is in a range of 0 to 90 degrees, said tilt-angle adjusting functions can rotate said upper-side body unit from said open tilt-angle range of 160 to 170 degrees up to an open tilt-angle of 180 degrees; and
   when the rotational angle of the upper-side body unit about said second rotating shaft is in a range of 90 to 180 degrees, said tilt-angle adjusting functions can rotate said upper-side body unit while maintaining said open tilt-angle at 180 degrees.

5. The foldable and portable mobile communication terminal according to claim 4, wherein said first hinge unit in said two-shaft hinge mechanism has pull-in opening/closing cams incorporated therein, said pull-in opening/closing cams forcibly positioning the open tilt-angle position at an angular position of 180 degrees, when said upper-side body unit is rotated about said second rotating shaft in the range of 180 degrees in either of said clockwise and counterclockwise directions after said upper-side body unit has been set at said predetermined talking position at which said open tilt-angle thereof with respect to the lower-side body unit is in said range of 160 to 170 degrees.

6. The foldable and portable mobile communication terminal according to claim 5, wherein said two-shaft hinge mechanism comprises a click mechanism, said click mechanism generating a holding force for holding said upper-side body unit in the closed state, in which the rotational angle of each of said first and second rotating shafts is 0 degree, and in the open state defining said predetermined talking position.

7. The foldable and portable mobile communication terminal according to claim 6, wherein, even when said upper-side body unit is rotated about said second rotating shaft from the open state defining said predetermined talking position in either of said clockwise and counterclockwise directions, said click mechanism performs said holding operation at each of plural predetermined kinds of rotational angular positions.

8. The foldable and portable mobile communication terminal according to claim 6, wherein said lower-side body unit has said operation section and a microphone for collecting sounds disposed on the folded surface folded with respect to said upper-side body unit, and wherein said upper-side body unit includes, as said display section, a first display portion disposed on said folded surface with respect to said lower-side body unit and a second display portion disposed on the surface opposite to said folded surface for displaying simple data including at least call notice out of data on said communication information processing, said upper-side body unit further comprising an operation section for display selection comprising a plurality of operation buttons serving a selectable display operation function for users, and a speaker for uttering voices, said operation section for display selection and said speaker being disposed in the vicinity of said first display portion on said folded surface.

9. A foldable and portable mobile communication terminal configured as a two-folded type by openably and closably coupling, by a hinge mechanism, a lower-side body unit that includes an operation section comprising a plurality of operation buttons, and an upper-side body unit that includes a display section for displaying data on the operational information processing associated with operation with respect to said operation section, and on the processing of communication information with an opposite party, related to said operational information processing, said foldable and portable mobile communication terminal comprising:

a two-shaft hinge mechanism as said hinge mechanism, wherein said two-shaft hinge mechanism comprises a first hinge unit that allows said upper-side body unit to rotate with respect to said lower-side body unit up to the open state defining a predetermined talking position, and a second hinge unit that allows said first hinge unit to rotate in a direction different from said rotational direction of said first hinge unit;

wherein said first and second hinge units are coupled so that the rotational center axes thereof orthogonally intersect each other; and wherein said first hinge unit is accommodated in said upper-side body unit, and wherein said second hinge unit is accommodated in said lower-side body unit so that a part thereof projects from said lower-side body unit.

10. The foldable and portable mobile communication terminal according to claim 9, wherein:

said first and second hinge units have first and second rotating shafts, respectively;

said two-shaft hinge mechanism defines said predetermined talking position by rotating said upper-side body unit about said first rotating shaft, and also allows said upper-side body unit to rotate about said second rotating shaft at a position within the surface of said lower-side body unit in either of the clockwise and counterclockwise directions; and said two-shaft hinge mechanism has tilt-angle adjusting functions of controlling the open tilt-angle of said upper-side body unit according to the rotational angle thereof about said second rotating shaft so as to become an angle defining said predetermined talking position and an angle formed by said upper-side body unit rotating about said second rotating shaft off the angle defining said predetermined talking position.

11. The foldable and portable mobile communication terminal according to claim 10 wherein said tilt-angle adjusting functions of said two-shaft hinge mechanism rotate said upper-side body unit about said first rotating shaft from the closed state in which the rotational angle of each of said first and second rotating shafts is 0 degree, up to said open state, and thereafter, said tilt-angle adjusting functions can set said open tilt-angle for defining said predetermined talking position in a range of 160 to 170 degrees;

said tilt-angle adjusting functions can perform setting such that the upper-side body unit can rotate about said second rotating shaft from said open tilt-angle range of 160 to 170 degrees, in an angle range of 180 degrees in either of the clockwise and counterclockwise directions;

when the rotational angle of the upper-side body unit about said second rotating shaft is in a range of 0 to 90 degrees, said tilt-angle adjusting functions can rotate said upper-side body unit from said open tilt-angle range of 160 to 170 degrees up to an open tilt-angle of 180 degrees; and when the rotational angle of the upper-side body unit about said second rotating shaft is in a range of 90 to 180 degrees, said tilt-angle adjusting functions can rotate said upper-side body unit while maintaining said open tilt-angle at 180 degrees.

* * * * *